Patented Nov. 13, 1945

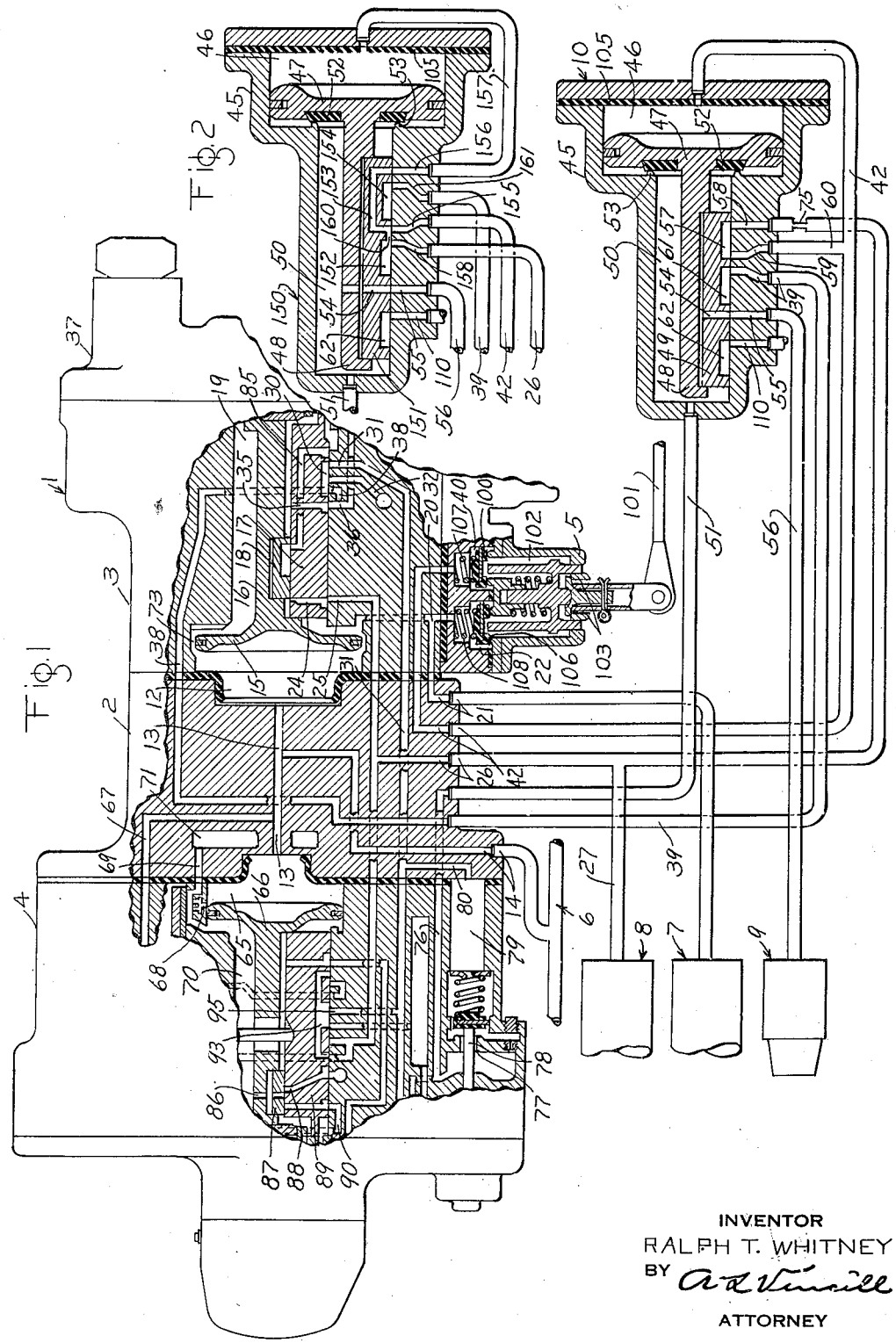

2,389,100

UNITED STATES PATENT OFFICE 2,389,100

FLUID PRESSURE BRAKE

Ralph T. Whitney, Irwin, Pa., assignor to The Westinghouse Air Brake Company, Wilmerding, Pa., a corporation of Pennsylvania Application September 14, 1943, Serial No. 502,277

22 Claims. (Cl. 303—68)

This invention relates to fluid pressure brake apparatus of the automatic type and more particularly to means for causing operation of said apparatus to effect a release of the brakes.

When a car equipped with automatic brake apparatus and having the reservoir or reservoirs thereof charged with fluid under pressure is cut out of a train and the brake pipe on the car is vented, the brake controlling valve device will as a result of such venting move to emergency position. Upon movement of the brake controlling valve device to emergency position, communication is established between the reservoir or reservoirs and the brake cylinder device. With this communication established, the pressure of fluid in the reservoir or reservoirs equalizes into the brake cylinder device and effects an emergency application of the brakes on the car.

In order to release a brake application thus effected, the heretofore customary practice has been for a trainman to operate the reservoir release valve or valves to completely dissipate the fluid pressure from the reservoir or reservoirs and thereby from the connected brake cylinder device. This operation not only wastes the stored fluid pressure in the reservoir but also requires time on the part of the trainman, since he must hold the reservoir release valve or valves open until the brakes are released. When the car is subsequently placed in a train, it is then necessary to completely recharge the reservoir or reservoirs, either by a local yard charging plant or by a coupled locomotive, before the train may be moved. This requires a relatively long period of time and consequently excessive use and wear of apparatus to accomplish same, all of which is undesirable.

From the foregoing, it will be apparent that it is desirable to release the brakes on a car, when the car is cut out of a train, without dissipating the stored fluid pressure in the reservoir or reservoirs, and the principal object of the invention is to provide novel brake release means for accomplishing this result.

Other objects and advantages will be apparent from the following more detailed description of the invention.

In the accompanying drawing Fig. 1 is a diagrammatic view of an "AB" brake equipment having associated therewith brake release means embodying one form of the invention; and Fig. 2 is a fragmentary diagrammatic view illustrating another form of the invention.

As shown in the drawing the brake equipment comprises a brake controlling valve device 1 embodying a pipe bracket 2, a service application valve portion 3 mounted on one face of said bracket, an emergency application valve portion 4 mounted on another face of said bracket, a release valve portion 5, mounted on the service application valve portion 3, and other portions which, while shown in elevation do not enter into the invention and will not therefore be described in detail. The brake equipment further comprises the usual brake pipe 6, auxiliary reservoir 7, emergency reservoir 8, brake cylinder device 9, and a brake releasing valve device 10.

The brake controlling valve device 1 may be of the well known "AB" type disclosed in Patent 2,031,213, issued to Clyde C. Farmer on February 18, 1936, and since this device is well known by those skilled in the fluid pressure brake art the description thereof will be limited to only those parts which are required to bring out clearly the present invention.

The service application valve portion 3 comprises a casing having a piston chamber 12 which is connected to the brake pipe 6 by way of a passage 13 in the pipe bracket and a passage and pipe 14. Contained in piston chamber 12 is a piston 15 having a stem 16 adapted to actuate a main slide valve 17 and an auxiliary slide valve 18 contained in a valve chamber 19 which is connected to the auxiliary reservoir 7 by way of a passage 20 and a passage and pipe 21, the passage 20 also connecting valve chamber 19 with a valve chamber 22 in the reservoir release valve portion 5 in the usual manner.

As shown in the drawing, both the main slide valve 17 and the auxiliary slide valve 18 are in their normal or release position. With these slide valves thus positioned, the auxiliary slide valve 18 uncovers a port 24 in the slide valve 17 which is in registration with a passage 25 provided in the seat for the main slide valve 17. This passage 25 leads to the emergency portion 4 for purposes hereinafter described. The passage 25 is also connected to the brake releasing valve device 10 by way of a passage and pipe 26 and to the emergency reservoir 8 by way of a pipe 27 connected to the pipe 26.

The main slide valve 17 is provided with a cavity 30 which is adapted, in the release position of the slide valve, to connect a passage 31 with a passage 32 leading to the atmosphere for a reason hereinafter described. This slide valve is also provided with a through port 35 which, as shown, in release position of the slide valve is in registration with a passage 36 which leads to the usual release insuring portion 37 for a reason fully described in the aforementioned patent. The passage 36 is in constant open communication with a passage 38 which is connected by way of a pipe 39 to the brake releasing valve device 10.

The valve mechanism contained in the emergency application valve portion 4 of the brake controlling valve device 1 may be identical with that shown in the aforementioned patent, and since it has no particular bearing on the present invention other than to produce the usual well known functions, it is deemed unnecessary to show and describe the mechanism in detail. However, in order to illustrate certain connections hereinafter described in connection with the operation of the equipment certain parts have been shown in section.

The release valve portion 5 is identical in construction with the reservoir release valve portion shown in the aforementioned Farmer patent. However, a chamber 40 which is connected to the emergency reservoir in the standard "AB" brake controlling valve device is, in the present equipment, connected to the releasing valve device 10 by way of a passage and pipe 42.

The releasing valve device 10 comprises a casing 45 having a piston chamber 46 which is in constant open communication with the pipe 42. Contained in piston chamber 46 is a piston 47 having a stem 48 adapted to actuate a slide valve 49 contained in a valve chamber 50 which is in constant open communication with a pipe 51 leading to the usual brake cylinder passage 76 in the pipe bracket 2 of the brake controlling valve device 1.

The back of the piston 47 is provided with a sealing gasket 52 which is adapted to engage a casing carried seat rib 53 when the piston is in the position shown, thus insuring against leakage between chambers 46 and 50.

The slide valve 49 is provided with a through port 54 which, with the slide valve in the position shown, is in registration with a passage 55, which passage is in constant open communication with a pipe 56 leading to the brake cylinder device 9. The slide valve is also provided with a cavity 57 which, with the slide valve in the position shown, connects a passage 58, and thereby the pipe 26 to a passage 59 which is connected to the pipe 42 by way of a branch pipe 60. The slide valve is further provided with a cavity 61 and a cavity 62 for a purpose hereinafter described in connection with the operation of the equipment.

*Operation*

When a car equipped with the brake apparatus just described is connected in a train, fluid under pressure is supplied to the brake pipe in the usual well known manner. From the brake pipe, fluid under pressure flows through pipe and passage 14 to the passage 13, from whence it flows in one direction to the piston chamber 12 in the service application portion 3 and in the opposite direction to a piston chamber 65 disposed at one side of the usual emergency piston 66 in the emergency application portion 4. From passage 13 fluid flows through a passage 67 to the usual quick action vent valve device contained in the emergency portion 4.

Fluid under pressure thus supplied to the emergency piston chamber 65 flows through a restricted charging port 68 to a passage 69 and from thence flows in one direction to the usual emergency valve chamber 70 at the opposite side of the emergency piston 66, and flows in the opposite direction to a quick action chamber 71, thus charging said chambers with fluid at the pressure in the brake pipe 6.

With the service piston 15 and slide valves 17 and 18 in their normal release position, as shown in the drawing, fluid under pressure supplied to piston chamber 12 flows through a feed groove 73 to valve chamber 19. From chamber 19 fluid under pressure flows through passage 20 to the valve chamber 22 in the reservoir release valve portion 5 and through connected passage and pipe 21 to the auxiliary reservoir 7. From the chamber 19 fluid under pressure also flows through port 35 in the main slide valve 17 to passage 36, connected passage 38 and pipe 39 for a purpose hereinafter described. Fluid under pressure in chamber 19 flows therefrom through port 24 in the main slide valve 17 to passage 25 from whence it flows to the emergency reservoir 8 through passage and pipe 26 and connected pipe 27. With the slide valve 49 of the brake releasing valve device 10 positioned as shown, fluid under pressure in pipe 26 and connected emergency reservoir flows to pipe 42 through a choke 75, passage 58, cavity 57 in the slide valve 49 of the releasing valve device 10, passage 59 and branch pipe 60. Fluid under pressure thus supplied to pipe 42 flows in one direction to the piston chamber 46 in the releasing valve device 10 and in the opposite direction through passage 42 to chamber 40 in the reservoir release valve portion 5 of the brake controlling valve device 1.

With the slide valve 49 of the brake releasing valve device 10 and the main slide valve 17 of the service application portion 3 in their normal release position, as shown in the drawing, the brake cylinder device 9 is vented to the atmosphere, the communication from the brake cylinder 9 to the atmosphere being established by way of pipe 56, passage 55, port 54 in slide valve 49, valve chamber 50, pipe 51, the passage 76, in the emergency application portion 4, a passage 77 in the usual brake cylinder buildup control valve device 78, a chamber 79, a passage 80 in the pipe bracket 2, passage 31, cavity 30 in the service application slide valve 17 and passage 32.

From the foregoing description of the charging of the equipment it will be seen that the brakes are released and that the equipment is charged to its normal pressure with fluid from the brake pipe 6.

Assume now that a train charged with fluid under pressure and containing one or more cars equipped with apparatus comprising the present invention is running over the road and it is desired to bring the train to rest by effecting a service application of the brakes. Upon effecting the service application of the brakes a service rate of reduction in pressure is effected in the brake pipe 6 and consequently in the piston chamber 12 of the service portion of the brake controlling valve device and in the piston chamber 65 of the emergency portion of the device.

Upon such a reduction in pressure in chamber 12, the piston 15 is caused to move to its application position in the usual manner. The piston during its movement from release position, in which it is shown, to service position, acts first to shift the auxiliary slide valve 18 relative to the main slide valve 17 to lap port 24 and to uncover a service port 85 in the main slide valve 17 to the valve chamber 19, and then shifts both slide valves in unison to service position. With both slide valves 17 and 18 in service position the service port 85 in slide valve 17 registers with passage 31. With this communication established fluid under pressure flows from the valve chamber 19 and connected auxiliary reservoir 7 to the brake cylinder 9 to effect an application of the brakes. The flow of fluid under pressure from valve chamber 19 to the brake cylinder 9 is by way of service port 85 in the slide valve 17, passage 31, passage 80, chamber 79, passage 77, passage 76, pipe 51, chamber 50 in the releasing valve device 10, port 54 in the slide valve 49, passage 55 and pipe 56.

Upon a service reduction in pressure in piston chamber 65 of the emergency portion 4, the emergency piston 66 will move in the direction of the pipe bracket 2 to its service position in which position a port 86 in the usual auxiliary slide valve 87 registers with a passage 88 in the main slide valve 89 which passage is connected to the atmosphere. With the auxiliary slide valve thus positioned, fluid under pressure in the valve chamber 70 and connected quick action chamber 71 flows to the atmosphere by way of port 86 in the auxiliary slide valve 87 and passage 88 in the main slide valve 89. This reduction of pressure from valve chamber 79 and quick action chamber 71 will be at the same rate as that of the brake pipe pressure acting on the opposite side of the piston 65 during a service application, so that the piston and associated parts are maintained in service position, all of which is in accordance with the usual operation of the emergency application portion of the "AB" valve.

From the foregoing it will be understood that when a full service application of the brakes is effected, the auxiliary reservoir pressure equalizes in the brake cylinder 9 and connected valve chamber 50 in the releasing valve device 10 and that the pressure of fluid in the emergency reservoir 8 and connected piston chamber 46 of the releasing valve device 10 is maintained at the pressure normally carried in the brake pipe 6. With normal emergency reservoir pressure acting over the entire outer face of piston 47 and the developed brake cylinder pressure acting within the seat rib 53 on the opposite side of the piston, it will be apparent that the piston 47 will be maintained in the position shown and will not interfere with normal operation of the brake controlling valve device 1 in effecting a service application of the brakes.

If, when the train is running over the road it is desired to effect an emergency application of the brakes instead of a service application the reduction in brake pipe pressure is made at an emergency rate. An emergency rate of reduction in brake pipe causes the piston 15 and associated slide valves 17 and 18 to move to their service position to supply fluid under pressure from the auxiliary reservoir 7 to the brake cylinder 9 in the same manner as hereinbefore described in connection with a service application of the brakes, and causes the emergency piston 66 and associated slide valves 87 and 89 to move to emergency position. During movement of the emergency piston from release position, in which it is shown, to emergency position, said piston acts first to shift the auxiliary slide valve 87 relative to the main slide valve 89 to service position to vent fluid under pressure from the valve chamber 70 and connected quick action chamber 71 in the same manner as already described in connection with a service application. However, the venting capacity of ports 86 and 88 is insufficient to reduce the pressure of fluid in valve chamber 70 as fast as the brake pipe pressure in piston chamber 65 is reducing, so that sufficient differential is obtained between the pressures in piston chamber 65 and valve chamber 70 and acting on piston 66 to cause said piston to move to its emergency position. This movement of the piston will shift the auxiliary and main slide valves 87 and 89, respectively, to emergency position in which a passage 90 is opened to valve chamber 70. Fluid under pressure will then flow from valve chamber 70 and connected quick action chamber 71 to passage 90 for actuating the piston of the usual quick action vent valve device which connects passage 67 to the atmosphere, thus a sudden local venting of fluid under pressure from the brake pipe 6 is effected in the usual manner.

With the main slide valve 89 in emergency position, a cavity 93 therein connects the passage 25 and connected emergency reservoir 8 to a passage 95 which is connected to passage 31, so that fluid under pressure is permitted to flow from the emergency reservoir 8 to the passage 31. Since passage 31 is supplied with fluid under pressure from the auxiliary reservoir 7 by operation of the service portion 3 and by fluid under pressure from the emergency reservoir 8 by operation of the emergency portion 4, fluid under pressure from both reservoirs will flow therefrom to the brake cylinder 9 through the circuit hereinbefore traced in connection with a service application of the brakes. From this it will be understood that the pressures of the reservoirs and brake cylinder will equalize and as a consequence the pressures of fluid acting on opposite sides of the piston 47 of the brake releasing valve device will also equalize. Since the fluid under pressure in chamber 46 acts over a greater area than does the fluid under pressure in chamber 50, the piston 47 and associated slide valve 49 will be maintained in the position in which they are shown.

It will here be understood that in effecting either a service or an emergency application of the brakes by effecting a reduction in brake pipe pressure, the brake releasing valve device will remain in the position in which it is shown and therefore will in no way interfere with the supply of fluid under pressure from the brake controlling valve device to the brake cylinder.

When it is desired to effect a normal release of the brakes following either a service or an emergency application, the brake pipe pressure is increased in the usual manner. Fluid under pressure then flows from brake pipe 6 to the piston chambers 12 and 65 of the service and emergency portions, respectively, to effect movement of the pistons 15 and 66 and their associated slide valves back to their normal release positions in the usual manner as fully described in the Farmer patent to effect a release of the brakes and to recharge the auxiliary and emergency reservoirs with fluid under pressure. The release of the brakes is effected by venting fluid under pressure from the brake cylinder 9 to the atmosphere by way of pipe 56, passage 55, port 54 in the slide valve 49 of the releasing valve device 10, chamber 50, pipe 51, passage 76, passage 78, chamber 79, passage 80, passage 31, cavity 30 in the slide valve 17 of the service application portion 3 and passage 32. Since the pressure of fluid in the emergency reservoir and thereby in the piston chamber 46 of the releasing valve device is at no time reduced below brake cylinder pressure it will be apparent that the releasing valve device 10 remains inoperative. It follows that the brakes may be applied and released in the usual manner without any interference by the brake releasing valve device 10.

If a car provided with the brake releasing valve device is cut-out of a train and the brake pipe vented, the brake controlling valve device 1 will operate to cause an emergency application of the brakes in the same manner as above described.

With the brakes on the car thus applied in emergency, the brake pipe 6, valve chamber 70, and quick action chamber 71 of the emergency portion of the brake controlling valve device will be at atmospheric pressure, so that the emergency piston 66 and associated slide valves 87 and 88 will remain in emergency position. As previously described in connection with effecting an emergency application of the brakes the pressure in the auxiliary and emergency reservoirs and the brake cylinder will be equalized, so that the equalized pressure acting in the connected valve chamber 19 of the service portion will maintain the service piston 15 and associated slide valves 17 and 18 in their application position.

Now, when it is desired to release the fluid under pressure from the brake cylinder device 9 in order to effect a release of the vehicle brakes, without recharging the brake pipe 6 and without losing the fluid under pressure stored in the auxiliary and emergency reservoirs 7 and 8, respectively, a valve 100 disposed in chamber 40 of the release valve portion 5 is unseated by the usual manipulation of the manually operative pull or push rod 101.

With the valve 100 unseated the pressure of fluid in piston chamber 46 of the releasing valve device 10 will be vented to the atmosphere, by way of pipe and passage 42, chamber 40 in the reservoir release valve portion 5, past unseated valve 100, a chamber 102 and the usual exhaust passages 103, at an unrestricted rate. When the pressure of fluid in piston chamber 46 has been thus reduced to a degree sufficient to permit the brake cylinder pressure acting within the seat rib 53 on the opposite side of the piston 47 to overcome the opposing pressure, the piston moves gasket 52 out of engagement with the rib 53 and permits brake cylinder pressure to act over the entire inner face of the piston 47, and as a result the piston and attached slide valve 49 quickly move to a position in which the outer face of the piston engages a gasket 105.

It should here be mentioned that the choke 75 restricts the flow of fluid from the emergency reservoir to the pipe 42 so that the piston 47 and attached slide valve 49 move to their outer position before there is any material drop in the pressure of fluid in the emergency reservoir. It should also be mentioned that although operation of the rod 101 of the reservoir release valve portion 5 acts to effect the unseating of a valve 106 to effect a release of fluid from chamber 22 and connected auxiliary reservoir 7 before the valve 100 is unseated, there will be no material loss of pressure from this reservoir since unseating of valve 100 quickly vents the small volume in piston chamber 46 and permits the piston 47 to move quickly therein to its outer position whereupon the rod 101 may be released by the operator to permit the associated springs 107 and 108 to act to quickly close the valves 100 and 106, respectively.

With the piston 47 in its outer position the slide valve 49 will be in a position in which it disconnects passage 58 from passage 59, and in which cavity 61 connects passage 59 to passage and pipe 39. Since the service piston 15 and associated slide valves 17 and 18 are now in their application positions, passage 39 is open to atmosphere by way of connected passages 38 and 36, cavity 30 in slide valve 17, and atmospheric passage 32. By reason of the connection of passage 59 to pipe and passage 39, chamber 46 will be at atmospheric pressure so long as the service piston 15 is in application position. Thus the piston 47 will remain in its right-hand position until such time as the slide valve 18 is moved to release position in which fluid under pressure from the auxiliary reservoir is supplied to passage 38 and thereby to piston chamber 46. With the slide valve in this position, the port 54 is moved out of registration with the passage 55 in the slide valve seat, thus disconnecting the brake cylinder device 9 from the brake controlling valve 1, and as a result, the auxiliary and emergency reservoirs 7 and 8, respectively, are both isolated from the brake cylinder device. At the same time the cavity 62 in the slide valve 49 connects passage 55 to a passage 110 leading to the atmosphere, thus fluid under pressure in the brake cylinder device is vented to the atmosphere by way of pipe 56, passage 55, cavity 62 in the slide valve 49 and passage 110, thus providing for a release of the brakes on the car without losing the fluid under pressure stored in said reservoirs.

When the car is cut into a train the brake pipe 6 and consequently the piston chambers 12 and 65 in the brake controlling valve device 1 are recharged with fluid under pressure in the usual manner. Upon a sufficient increase in the pressure of fluid in said piston chambers the piston 15 and associated slide valves 17 and 18 and the piston 66 and associated slide valves 87 and 89 will be caused to return to their release position, in which position they are shown in the drawing. Since the brake controlling valve device operates in the usual manner, and since the operation is fully described in the aforementioned patent it is deemed unnecessary to describe the release operation of all of the several parts of the device in detail.

With the emergency piston 66 and associated slide valves in the position shown, communication between passage 25 and passage 31 is disestablished and the valve chamber 70 and quick action chamber 71 are recharged in the manner previously described in connection with initial charging.

With the piston 15 and associated slide valves 17 and 18 positioned as shown, the valve chamber 19 and connected auxiliary and emergency reservoirs 7 and 8, respectively, are recharged in the manner already described under initial charging. As hereinbefore mentioned, with the slide valves 17 and 18 in this position the cavity 30 in the slide valve 17 connects passage 31 to passage 32 so that chamber 50 of the releasing valve device 10 is vented to the atmosphere by way of pipe 51, passages 76 and 77, chamber 79, passage 80, passage 31, cavity 30 in the slide valve 17 and passage 32. At the same time fluid under pressure flows from valve chamber 19 to pipe 39 by way of port 35 in the slide valve 17, passage 36, and passage 38. The fluid under pressure thus supplied to pipe 39 flows therefrom to the piston chamber 46 in the releasing valve device 10, by way of cavity 61 in the slide valve 49, passage 59, branch pipe 60 and pipe 42. Now, since valve chamber 50 is vented to the atmosphere when the pressure of fluid thus supplied to piston chamber 46 has been increased to a degree sufficient to overcome friction of the piston and attached slide valve 49, the piston and attached slide valves are moved to the position in which they are shown in the drawing. Upon movement of the slide valve 49 to the position shown the connections hereinbefore described are established and the equipment is conditioned for normal operation in accordance with variations in brake pipe pressure.

From the foregoing it will be apparent that if a car provided with brake equipment embodying the invention is set out of a train and has its brake applied in emergency, a trainman from the side of the car may release the brakes on the car without loss of the fluid pressure stored in the reservoirs of the equipment. When the car is subsequently cut into a train the charging of the brake pipe on the car will automatically reset the mechanism to provide for usual operation of the brake equipment in response to variations in pressure in the brake pipe, and the brake releasing valve device will remain in this condition until caused to operate in response to the manual operation.

If, at any time after fluid under pressure has been vented from the brake cylinder and the brakes thereby released, it is desired to vent the fluid under pressure from the auxiliary and emergency reservoirs, a trainman may, by the use of the pull or push rod 101, actuate the valve 106 of the releasing valve portion 5 to its unseated or venting position to permit fluid under pressure to flow from the slide valve chamber 19 of the brake controlling valve device and consequently from the connected auxiliary and emergency reservoirs to the atmosphere by way of passage 20 and the unseated valve 106. If it is desired to vent the fluid from the auxiliary and emergency reservoirs at the same time as fluid is being vented from the brake cylinder, the trainman, instead of permitting the valve 106 to seat shortly after it has been unseated, maintains the valve open. Obviously this will permit the discharging of fluid from the brake cylinder, auxiliary reservoir and emergency reservoir.

It will here be understood that if the slight loss of fluid from the auxiliary reservoir when the valve 106 is maintained unseated while the valve 100 is unseated is objectionable, the passage 20 where it opens into the chamber 22 may be closed by means of a plug not shown, or if desired the plunger which operates to control the valve 106 may be shortened sufficiently that it will not unseat the valve when the valve 100 is unseated. Either of these modifications will prevent the flow of fluid from the auxiliary reservoir and consequently from the emergency reservoir when the valve 100 is moved from its seat.

*Description of the apparatus shown in Fig. 2*

In Fig. 2 there is illustrated another form of the invention whereby the brake cylinder may be depleted of fluid under pressure without dissipating the stored fluid pressure in the auxiliary and emergency reservoirs, and whereby when desired both reservoirs as well as the brake cylinder may be depleted of fluid.

In this form of the invention the brake releasing valve device 150 is for most part identical with the valve device 10 shown in Fig. 1, the differences residing in the details of the slide valve and certain pipe connections of the valve device as will hereinafter appear.

The brake release valve device 150 is provided with a slide valve 151 having a cavity 152 and a connected port 153. With the slide valve in the position shown, the cavity 152 connects a passage 158 and thereby pipe 26 to a passage 155 which is connected to pipe 42. The connected port 153 connects the cavity 152 with a passage 156 which is connected to the piston chamber 46 by way of a pipe 157. The slide valve is also provided with the through port 54 which, with the slide valve in the position shown, is in registration with the passage 55, which passage, as hereinbefore described in connection with release valve device 10 shown in Fig. 1, is in constant open communication with the brake cylinder device 9. This slide valve is further provided with the cavity 62 which as before described in connection with release valve device 10 connects passages 110 and 55 when the slide valve is moved to its other position. In addition the slide valve 151 has a cavity 154 for a purpose hereinafter described in connection with the operation of the equipment.

*Operation*

When a car provided with brake apparatus embodying the release valve device 150 is cut into a train and the brake pipe charged with fluid under pressure, such pressure flows to the pipe 26 and connected emergency reservoir 8, in the same manner as already described in connection with Fig. 1. With the slide valve 151 of the release valve device 150 positioned as shown, fluid under pressure in pipe 26 and connected emergency reservoir flows to the piston chamber 46 in the release valve device through passage 158, cavity 152 in the slide valve 151, restricted passage 160, port 153, passage 156 and pipe 157. Fluid under pressure thus supplied to port 153 in the slide valve 151 also flows to chamber 40 in the reservoir release valve portion 5 of the brake controlling valve device by way of passage 155 and pipe and passage 42.

With the slide valve 151 of the brake release valve device 150 and the main slide valve 17 of the service portion 3 in their normal release position, as shown in Fig. 1 of the drawing, the brake cylinder device 9 is vented to the atmosphere, the communication from the brake cylinder to the atmosphere being established by way of pipe 56, passage 55, port 54 in the slide valve 151, valve chamber 50, pipe 51 and the usual exhaust path through the brake controlling valve device 1. From the foregoing description of the equipment in connection with Fig. 1 it will be understood that when effecting an application of the brakes the pressure of the reservoirs and brake cylinder will equalize and as a consequence the pressures of fluid acting on the opposite sides of the piston 47 in the brake releasing valve will also equalize. Since the fluid under pressure in chamber 46 acts over a greater area than does the fluid under pressure in chamber 50, the piston 47 and associated slide valve 151 will be maintained in the position in which they are shown. As already mentioned in connection with the releasing valve device 10, the pressure of fluid in the emergency reservoir and thereby in the piston chamber 46 of the releasing valve device is at no time during normal operation reduced below brake cylinder pressure, so that the releasing valve device 150 will remain inoperative. Thus the brakes may be applied and released in the usual manner without any interference by the brake releasing valve device 150.

If a car provided with the brake releasing valve device 150 is cut out of a train and the brake pipe vented, the brake controlling valve device 1 will operate to cause an emergency application of the brakes in the same manner as described in connection with Fig. 1.

Now, if with the brakes applied as just described, it is desired to release fluid under pressure from the brake cylinder to release the brakes, without recharging the brake pipe and without losing the fluid under pressure stored in the auxiliary and emergency reservoirs 7 and 8, respectively, the valve 100 disposed in chamber 40 of the release valve portion 5 is unseated by the usual manipulation of the manually operative pull or push rod 101.

With the valve 100 unseated the pressure of fluid in piston chamber 46 of the releasing valve device 150 will be released to the atmosphere, by way of pipe 157, passage 156, port 153 in the slide valve 150, passage 155, pipe and passage 42, chamber 40 in the release valve portion 5, past unseated valve 100, chamber 102 and the usual exhaust passage 103 at an unrestricted rate. When the pressure of fluid in piston chamber 46 has been thus reduced to a degree sufficient to permit the brake cylinder pressure acting within the seat rib 53 on the opposite side of the piston 47 to overcome the opposing pressure in chamber 46, the piston and attached slide valve 151 are caused to move to their outer position in which the outer face of the piston engages the gasket 105.

It will be understood that the restricted passage 160 restricts the flow of fluid from cavity 152 in the slide valve 150 and connected emergency reservoir 8 to port 152 and connected pipe 42 so that the piston 47 and attached slide valve move to their outer position before there is any material drop in the pressure of fluid in the emergency reservoir. From the foregoing description in connection with Fig. 1 it will be understood that the valve 100 quickly vents the small volume in piston chamber 46 and permits the piston 47 to be quickly shifted therein to its outer position, whereupon the rod 101 may be released by the operator to permit the associated springs 107 and 108 to act to quickly close the valves 100 and 106, respectively.

With the piston 47 in its outer position the slide valve 151 will be in a position in which it disconnects passage 155 from passage 156, and in which cavity 154 connects passage 156 to a passage 161 and connected pipe 39 for the purpose described in connection with Fig. 1. With the slide valve in this position, the cavity 152 therein connects passages 158 and 155 so that emergency reservoir pressure may flow from said reservoir to chamber 40 in the release valve portion 5 at an unrestricted rate by way of pipes 27 and 26, passage 158, cavity 152 in the slide valve 150, passage 155 and pipe and passage 42 for a purpose hereinafter described. However at this time the valve 100 is seated and there is no loss of fluid under pressure from the emergency reservoir. With the slide valve in this position the port 54 therein is moved out of registration with passage 55 in the slide valve seat and the cavity 62 in the slide valve connects passage 55 to passage 110 so that the auxiliary and emergency reservoirs are isolated from the brake cylinder and the brake cylinder is vented to the atmosphere thus providing for the release of the brakes on the car without losing the fluid under pressure stored in said reservoirs in the same manner as previously described in connection with the operation of the releasing valve device 10.

When the brake pipe pressure is increased to effect a release of the brakes and the brake controlling valve device has returned to release position fluid under pressure will be supplied to piston chamber 46 of the releasing valve device 150 by way of pipe 39, cavity 154 in the slide valve 150, passage 156 and pipe 157. The supply of fluid to pipe 39 taking place through the circuit hereinbefore traced in connection with the operation of the apparatus illustrated in Fig. 1. It will also be understood from the previous description in connection with Fig. 1 that operation of the brake controlling valve device to its release position vents fluid under pressure from the valve chamber 50 in the releasing valve device so that when the pressure of fluid in chamber 46 has been increased to a degree sufficient to overcome friction of the piston 47 and attached slide valve 150, the piston and attached slide valve are moved to the position in which they are shown in Fig. 2 of the drawing.

If for any reason it is desired to effect operation of the releasing valve device 150 to effect a release of the brakes and to at the same time deplete the auxiliary and emergency reservoir of fluid under pressure it is only necessary for the operator to unseat and maintain unseated the valves 100 and 106 in the release valve portion 5 by the usual manipulation of the pull or push rod 101. Unseating of the valve 100 will first effect operation of the releasing valve device 150 in the manner just described to effect a release of the brakes and since slide valve 150 in its brake releasing position connects the emergency reservoir to chamber 40 as already described it will be apparent that with the valve 100 maintained unseated the emergency reservoir will be depleted of fluid under pressure. The flow of fluid under pressure from the auxiliary reservoir to the atmosphere will take place in the usual manner past the unseated valve 106.

From the foregoing description of operation of the embodiment of the invention shown in Fig. 2 it will be understood that the usual release valve portion 5 of the brake controlling valve device 1 may be employed in the usual manner to dissipate fluid under pressure from the auxiliary and emergency reservoir at the same time as fluid under pressure is being released from the brake cylinder if so desired and may also be employed to effect operation of releasing valve device which is operative to vent brake cylinder pressure without dissipating the fluid under pressure stored in said reservoirs.

Having now described my invention, what I claim as new and desire to secure by Letters Patent, is:

1. The combination with a brake controlling valve device of the type operative upon a gradual or service reduction in brake pipe pressure for supplying fluid under pressure from a normally charged auxiliary reservoir to a brake cylinder to effect a service application of the brakes and operative upon a sudden or emergency reduction in brake pipe pressure for supplying fluid under pressure from the auxiliary reservoir and a supplementary reservoir to the brake cylinder to effect an emergency application of the brakes, of a valve normally establishing communication through which fluid under pressure supplied by said brake controlling valve device flows to the brake cylinder and operative to a position to close said communication and to open a communication from said brake cylinder to the atmosphere, a movable abutment for actuating said valve, said abutment being subject to the pressure of fluid from the supplementary reservoir and the opposing pressure of fluid supplied by the brake controlling valve device and being operative upon a reduction in the pressure of fluid acting on said movable abutment in opposition to the pressure of fluid supplied by the brake controlling valve device for actuating said valve to the position for establishing the communication from the brake cylinder to the atmosphere, means for restricting the flow of fluid under pressure from said supplementary reservoir to said abutment, and means operative to effect a reduction in the pressure of fluid acting on said abutment.

2. The combination with a brake controlling valve device of the type operative upon a gradual or service reduction in brake pipe pressure for supplying fluid under pressure from a normally charged auxiliary reservoir to a brake cylinder to effect a service application of the brakes and operative upon a sudden or emergency reduction in brake pipe pressure for supplying fluid under pressure from the auxiliary reservoir and a supplementary reservoir to the brake cylinder to effect an emergency application of the brakes, of a chamber, a valve normally establishing a first communication through which fluid under pressure supplied by said brake controlling valve device flows to the brake cylinder and establishing a second communication through which fluid under pressure flows from the supplementary reservoir to said chamber and operative to a position to close said first and second communications and to open a third communication from said brake cylinder to the atmosphere, a movable abutment for actuating said valve, said abutment being normally subject to the pressure of fluid in said chamber and the opposing pressure of fluid supplied by the brake controlling valve device and operative upon a reduction of pressure of fluid in said chamber acting on said abutment in opposition to the pressure of fluid supplied by the brake controlling valve device for actuating said valve to the position for closing said first and second communications and for establishing said third communication, a choke disposed in said second communication for restricting the flow of fluid under pressure from said supplementary reservoir to said chamber, and means operative to effect a reduction in the pressure of fluid in said chamber.

3. The combination with a brake controlling valve device of the type operative upon a gradual or service reduction in brake pipe pressure for supplying fluid under pressure from a normally charged auxiliary reservoir to a brake cylinder to effect a service application of the brakes and operative upon a sudden or emergency reduction in brake pipe pressure for supplying fluid under pressure from the auxiliary reservoir and supplementary reservoir to the brake cylinder to effect an emergency application of the brakes, of a chamber, a valve normally establishing a first communication through which fluid under pressure supplied by said brake controlling valve device flows to the brake cylinder and establishing a second communication through which fluid under pressure flows from the supplementary reservoir to said chamber and operative to a position to close said first and second communications and to open a third communication from said brake cylinder to the atmosphere, a movable abutment for actuating said valve, said abutment being subject on one side to the pressure of fluid in said chamber and on its opposite side to the pressure of fluid supplied by said brake controlling valve device to said brake cylinder and operative upon a reduction in pressure in said chamber for actuating said valve to the position for closing said first and second communications and for establishing said third communication, and means operative to effect a reduction in the pressure of fluid in said chamber.

4. The combination with a brake controlling valve device of the type operative upon a gradual or service reduction in brake pipe pressure for supplying fluid under pressure from a normally charged auxiliary reservoir to a brake cylinder to effect a service application of the brakes and operative upon a sudden or emergency reduction in brake pipe pressure for supplying fluid under pressure from the auxiliary reservoir and a supplementary reservoir to the brake cylinder to effect an emergency application of the brakes, of a chamber, a slide valve having a normal position for establishing a first communication through which fluid under pressure supplied by said brake controlling valve device flows to the brake cylinder and a second communication through which fluid under pressure flows from the supplementary reservoir to said chamber and movable to another position to close said first and second communications and to open a third communication from said brake cylinder to the atmosphere, means subject to the pressure of fluid supplied to said brake cylinder and the pressure of fluid in said chamber for controlling said slide valve and operative upon a reduction in pressure in said chamber for actuating said slide valve from said normal position to said other position, means disposed in said second communication for restricting the flow of fluid under pressure from said supplementary reservoir to said chamber, and valve means manually operative to effect a reduction in the pressure of fluid in said chamber.

5. The combination with a brake controlling valve device of the automatic type having a brake cylinder and a brake cylinder conduit through which fluid under pressure may flow to and from said brake cylinder, of a valve interposed in said conduit, said valve having a normal position in which said conduit is open and a second position in which the conduit is closed and a communication from the brake cylinder to the atmosphere is open, means subject on opposite sides to fluid pressure and responsive to a reduction in the pressure of fluid acting on one side thereof for actuating said valve from said normal position to said second position and upon a subsequent increase in fluid under pressure on said one side for actuating said valve from said second position to said normal position, valve means manually operative to effect a reduction in pressure of fluid acting on said one side of said means to cause the means to shift said valve from said normal position to said second position, and a communication through which fluid under pressure may be supplied by said brake controlling valve device only in its brake release position to said means for actuating said valve from said second to said normal position, said last mentioned communication being open when said valve is in said second position and closed when said valve is in said normal position.

6. The combination with a brake controlling valve device of the automatic type having a brake cylinder and a brake cylinder conduit through which fluid under pressure may flow to and from said brake cylinder, of a valve interposed in said conduit, said valve having a normal position in which said conduit is open and a second position in which the conduit is closed and a communication from the brake cylinder to the atmosphere is open, a chamber, a movable abutment responsive to a reduction in pressure in said chamber for actuating said valve from said normal position to said second position and upon a subsequent increase in pressure in said chamber for actuating said valve from said second position to said normal position, means operative to effect a reduction in pressure in said chamber to cause said abutment to actuate said valve from said normal position to said second position, and a communication when open for supplying fluid under pressure to said chamber for causing said means to actuate said valve from said second position to said normal position, said communication being controlled by both said brake controlling valve device and said valve and being open only when said brake controlling valve device is in its release position and said valve is in said second position.

7. The combination of a brake controlling valve device of the automatic type including a slide valve having an application position and a release position, a brake cylinder, and a brake cylinder conduit through which fluid under pressure may be supplied to said brake cylinder when said slide valve is in said application position and through which fluid under pressure may be released from said brake cylinder when said slide valve is in said release position, a valve having a normal position in which said conduit is open and another position in which said conduit is closed and a communication from the brake cylinder to the atmosphere is open, a piston subject to the pressure of fluid supplied to said brake cylinder and an opposing fluid pressure for controlling said valve and operative upon a reduction in said opposing pressure for actuating said valve from said normal position to said other position and upon a decrease in the pressure of fluid supplied to the brake cylinder and a subsequent increase in the opposing pressure for actuating said valve from said other position to said normal position, valve means manually operative to effect a reduction in said opposing pressure, and a port in said slide valve through which fluid under pressure may flow to increase said opposing pressure when said slide valve is in said release position and said valve is in said other position.

8. The combination of a brake pipe, a brake controlling valve device operative to a release position upon an increase in pressure in said brake pipe and to an emergency application position upon a sudden decrease in pressure in said brake pipe, reservoir means charged with fluid under pressure when said controlling valve device is in release position and comprising an auxiliary and a supplementary reservoir, a brake cylinder operable to effect an application of the brakes by fluid under pressure supplied thereto, a passage for connecting said reservoir means to said brake cylinder through which fluid under pressure is supplied from said reservoir means to said brake cylinder upon operation of said brake controlling valve device to its emergency application position, a chamber, valve means having a normal position in which said passage is open and for establishing a communication through which fluid under pressure is supplied from said supplementary reservoir to said chamber for maintaining said valve means in said normal position and operative to a second position upon a reduction in pressure in said chamber for closing said passage and said communication and for venting said brake cylinder, means manually operative to effect a reduction in the pressure of fluid in said chamber, and a port through which fluid under pressure is supplied to said chamber to automatically effect operation of said valve means from said second position to said normal position upon operation of said brake controlling valve device to said release position.

9. A release valve mechanism for interposition between the brake cylinder connection of a brake controlling valve device and its brake cylinder, said mechanism comprising, in combination, a chamber, a valve having a normal position in which it connects the brake cylinder connection with the brake cylinder and connects said chamber to a source of fluid under pressure, and another position in which it disconnects the brake cylinder connection from the brake cylinder and the chamber from the source of fluid under pressure and vents the brake cylinder, means for restricting the flow of fluid under pressure from said source of fluid under pressure to said chamber when said valve is in said normal position, a piston subject to the pressure of fluid in said chamber and the opposing pressure of fluid in the brake cylinder connection of the brake controlling valve device for normally maintaining said valve in said normal position and operative upon a reduction in pressure in said chamber acting on said piston in opposition to the pressure of fluid in the brake cylinder connection of the brake controlling valve device for actuating said valve to said other position, and manually operable means for effecting a reduction in pressure in said chamber.

10. In a fluid pressure brake, in combination, a brake cylinder device; an auxiliary reservoir; an emergency reservoir; a source of fluid under pressure; a brake controlling valve device comprising a service portion having a release position in which said source of fluid under pressure is connected to said reservoirs for charging same with fluid under pressure, a brake cylinder connection is open to the atmosphere, and a control passage is open, and movable to an emergency position in which the connection between said source of fluid under pressure and said reservoirs and between said brake cylinder and the atmosphere is closed and the connection between said auxiliary reservoir and said brake cylinder connection is opened and said control passage is closed; said brake controlling valve device further comprising an emergency portion having an emergency position in which communication is established between said emergency reservoir and said brake cylinder connection, a conduit connecting said brake cylinder connection to said brake cylinder device; a chamber; a valve interposed in said conduit having one position for opening communication between said brake cylinder connection and said brake cylinder device and for opening a communication to said chamber, and another position for closing said communications and for opening a connection between said brake cylinder device and the atmosphere; means subject to the pressure of fluid in said chamber for controlling said valve, said chamber being normally charged with fluid under pressure from said emergency reservoir through the second mentioned communication in said valve for causing said means to normally maintain said valve in said one position, said means being operative upon a reduction in pressure in said chamber for actuating said valve to said other position and operative to said one position from said other position by a subsequent increase in the pressure of fluid in said chamber supplied thereto through said control passage; and means operable manually for venting fluid under pressure from said chamber.

11. In combination with a fluid pressure brake equipment of the type employing a normally charged reservoir and a controlling valve device operative in a brake applying position to supply fluid under pressure from said reservoir to a brake cylinder to effect an application of the brakes, of a normally closed exhaust conduit, a valve operative to open said conduit, a control chamber normally charged with fluid under pressure at a restricted rate from said reservoir, a passage for connecting said chamber to said conduit, another passage of relatively unrestricted flow area for connecting said reservoir to said conduit, valve means having a normal position for opening said restricted passage and for opening a communication through which fluid under pressure supplied by said controlling valve device flows to the brake cylinder, said valve means being movable to another position to close said restricted passage and said communication and to open said other passage and another communication through which said brake cylinder is vented to the atmosphere, and means operative to open said valve to effect a reduction in pressure in said chamber.

12. In combination with a fluid pressure brake equipment of the type having two normally charged reservoirs and a brake controlling valve device operative in an emergency position to supply fluid under pressure from said reservoirs to a brake cylinder to effect an emergency application of the brakes, of an atmospheric passage, a valve normally positioned for closing said passage and operative to another position for opening said passage, valve means operative upon operation of said valve to said other position when said brake controlling valve device is in said emergency position for cutting off the supply of fluid under pressure from said brake controlling valve device to said brake cylinder and for opening a communication through which fluid under pressure is vented from the brake cylinder to effect a release of the brakes, said valve means also being operative to establish another communication from one of said reservoirs to said atmospheric passage and means for actuating said valve from said normal position to said other position.

13. In combination with a fluid pressure brake equipment of the type having two normally charged reservoirs and a brake controlling valve device operative in an emergency position to supply fluid under pressure from said reservoirs to a brake cylinder to effect an emergency application of the brakes, of a control chamber, a passage through which fluid under pressure in said control chamber may be released to the atmosphere, a valve normally closing said passage, valve means responsive to a reduction in pressure in said control chamber when said brake controlling valve device is in said emergency position for cutting off the supply of fluid under pressure from said brake controlling valve device to the brake cylinder and for opening a communication from said brake cylinder to the atmosphere to effect a release of the brakes, said valve means also being operative upon a reduction in pressure in said control chamber to establish another communication from one of said reservoirs to said passage and means operative to open said valve.

14. In combination with a fluid pressure brake equipment of the type having two normally charged reservoirs and a brake controlling valve device operative in an emergency position to supply fluid under pressure from said reservoirs to a brake cylinder to effect an emergency application of the brakes, of a release valve mechanism having a chamber normally charged with fluid under pressure, valve means manually operative for reducing fluid under pressure from said chamber, and a valve device operative upon initiating a reduction in the pressure of fluid in said chamber when said brake controlling valve device is in said emergency position for isolating said reservoir from the brake cylinder and for at the same time releasing fluid under pressure from the brake cylinder to effect a release of the brakes, said valve device also being operative to establish a communication from one of said reservoirs to said chamber.

15. The combination with a brake controlling valve device of the type operative upon a service reduction in brake pipe pressure for supplying fluid under pressure from a normally charged auxiliary reservoir to a brake cylinder to effect a service application of the brakes and operative upon an emergency reduction in brake pipe pressure for supplying fluid under pressure from the auxiliary reservoir and an emergency reservoir to the brake cylinder to effect an emergency application of the brakes, of a first chamber, a second chamber, a valve having a normal position for establishing a first communication through which said first chamber is connected to said second chamber and a second communication through which fluid under pressure supplied to the emergency reservoir flows to said first communication and a third communication through which fluid under pressure supplied by said brake controlling valve device flows to the brake cylinder, said valve having another position for closing said first, second and third communications and for opening a fourth communication through which fluid under pressure supplied to the emergency reservoir flows to said first chamber and a fifth communication through which fluid under pressure may be released from the brake cylinder to the atmosphere, a movable abutment responsive to a reduction in pressure of fluid in second chamber for actuating said valve from said normal position to said other position, and means manually operative to effect a reduction in the pressure of fluid in said first chamber and thereby said second chamber when said valve is in said normal position.

16. A release structure for fluid pressure brake equipment of the type comprising a brake pipe, a reservoir normally charged with fluid under pressure, brake control means operable by fluid under pressure to effect an application of brakes and operable upon a release of fluid under pressure to effect a release of the brakes, a brake controlling valve device operable upon a reduction in brake pipe pressure to establish communication between said reservoir and brake control means for supplying fluid under pressure from said reservoir to said brake control means, and a reservoir release valve device operable to release fluid under pressure from said reservoir, said structure comprising in combination with said reservoir release valve device, valve means operable to close said communication and to release fluid under pressure from said brake control means, and means controlled by said reservoir release valve device arranged to control operation of said valve means.

17. A release structure for fluid pressure brake equipment of the type comprising a brake pipe, a reservoir normally charged with fluid under pressure, brake control means operable by fluid under pressure to effect an application of brakes and operable upon a release of fluid under pressure to effect a release of the brakes, a brake controlling valve device operable upon a reduction in brake pipe pressure to establish communication between said reservoir and brake control means for supplying fluid under pressure from said reservoir to said brake control means, a valve operable to release fluid under pressure from said reservoir, and an operating member for actuating said valve, said structure comprising in combination with said member, a second valve operable by said member, and means responsive to operation of said second valve to close said communication and to release fluid under pressure from said brake control means.

18. A release structure for fluid pressure brake equipment of the type comprising a brake pipe, a reservoir normally charged with fluid under pressure, brake control means operable by fluid under pressure to effect an application of brakes and operable upon a release of fluid under pressure to effect a release of the brakes, a brake controlling valve device operable upon a reduction in brake pipe pressure to establish communication between said reservoir and brake control means for supplying fluid under pressure from said reservoir to said brake control means, valve means operable to release fluid under pressure from said reservoir, and an operating member for actuating said valve means, said structure comprising, in combination with said member, other valve means operable by said member to close said communication and to release fluid under pressure from said brake control means, the operating connection between said member and said other valve means providing for selective operation of either the said other valve means only or of both valve means.

19. In a fluid pressure brake equipment in combination, a brake pipe, a reservoir normally charged with fluid under pressure, brake control means operable by fluid under pressure to effect an application of brakes and operable upon release of fluid under pressure to effect a release of brakes, a brake controlling valve device operable upon a reduction in pressure in said brake pipe to open communication between said reservoir and brake control means for supplying fluid under pressure to said brake control means, valve means operable to release fluid under pressure from said reservoir and also operable to close said communication and release fluid under pressure from said brake control means, and a member operative manually to effect operation of said valve means.

20. In a fluid pressure brake equipment in combination, a brake pipe, a reservoir normally charged with fluid under pressure, brake control means operable by fluid under pressure to effect an application of brakes and operable upon release of fluid under pressure to effect a release of brakes, a brake controlling valve device operable upon a reduction in pressure in said brake pipe to open communication between said reservoir and brake control means for supplying fluid under pressure to said brake control means, valve means operable to release fluid under pressure from said reservoir, a member operable manually to effect operation of said valve means, other valve means responsive to operation of said member to close said communication and to release fluid under pressure from said brake control means, means operable upon operation of said other valve means to open said communication, to maintain the said other valve means in the condition opening said communication and rendered ineffective upon an increase in pressure in said brake pipe.

21. A release structure for a fluid pressure brake equipment of the type comprising a brake pipe, an auxiliary reservoir, an emergency reservoir, brake control means operable by fluid under pressure to effect an application of brakes and operable upon release of fluid under pressure to effect a release of brakes, a brake controlling valve device operable upon an increase in brake pipe pressure to supply fluid under pressure to said reservoirs and to release fluid under pressure from said brake control means and operable upon a reduction in brake pipe pressure to open communication between said reservoirs and brake control means for supplying fluid under pressure to said brake control means, and a reservoir release valve device operable manually to release fluid under pressure from said reservoirs, of a brake release valve device operable to close said communication and to release fluid under pressure from said brake control means, and means for controlling said brake release device controlled by said reservoir release valve device.

22. In a fluid pressure brake equipment in combination, a brake pipe, an auxiliary reservoir, an emergency reservoir, brake control means operable by fluid under pressure to effect an application of brakes and operable upon release of fluid under pressure to effect a release of brakes, a brake controlling valve device operable upon an increase in brake pipe pressure to supply fluid under pressure to said reservoirs and to release fluid under pressure from said brake control means and operable upon a reduction in brake pipe pressure to open communication between said reservoirs and brake control means for supplying fluid under pressure to said brake control means, valve means normally opening said communication and operable to close said communication and to release fluid under pressure from said brake control means, other valve means operable to release fluid under pressure from said reservoirs, and a manually operable member operable to control both of said valve means.

RALPH T. WHITNEY.